United States Patent
Stumpe et al.

[11] Patent Number: 5,938,295
[45] Date of Patent: *Aug. 17, 1999

[54] PROCESS AND APPARATUS FOR CONTROLLING THE BRAKE SYSTEM OF A VEHICLE

[75] Inventors: Werner Stumpe, Stuttgart; Andreas Schlichenmaier, Zaberfeld; Heinz Kaechele, Ballendorf; Volker Graf, Eberdingen-Hochdorf; Bernhard Schwendemann, Schorndorf; Juergen Wrede, Bietigheim-Bissingen, all of Germany

[73] Assignee: Robert Bosch GmbH, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/584,943

[22] Filed: Jan. 16, 1996

[30] Foreign Application Priority Data

Jan. 18, 1995 [DE] Germany ............... 195 01 286

[51] Int. Cl.⁶ ...................................... B60T 8/18
[52] U.S. Cl. ............................................ 303/9.69
[58] Field of Search .................... 307/3, 15, 20, 307/22.1, 155, 186, 9.62, 9.69

[56] References Cited

U.S. PATENT DOCUMENTS

| | | | |
|---|---|---|---|
| 4,327,414 | 4/1982 | Klein | 303/155 X |
| 4,677,557 | 6/1987 | Stumpe | 303/9.69 X |
| 4,712,839 | 12/1987 | Brearley et al. | 303/15 X |
| 4,714,299 | 12/1987 | Takata et al. | 303/100 |
| 4,795,219 | 1/1989 | Brearley et al. | 303/22.1 X |
| 5,460,434 | 10/1995 | Micke et al. | 303/9.62 |
| 5,615,931 | 4/1997 | Stumpe et al. | 303/22.1 |

FOREIGN PATENT DOCUMENTS

| | | |
|---|---|---|
| 2726241 | 5/1996 | France . |
| 4141874 | 6/1992 | Germany . |
| 4241149 | 6/1994 | Germany . |
| 4243668 | 6/1994 | Germany . |

*Primary Examiner*—Robert J. Oberleitner
*Attorney, Agent, or Firm*—Fulbright & Jaworski, LLP

[57] ABSTRACT

An electronic control unit adjusts the pressure in the brake cylinders of at least one axle during the braking process on the basis of measured static and dynamic loads at the other axle.

6 Claims, 5 Drawing Sheets

PROCESS AND APPARATUS FOR CONTROLLING THE BRAKE SYSTEM OF A VEHICLE

The invention pertains to a process and to a device for controlling the brake system of a vehicle, especially a brake system with closed-loop electronic control.

In brake systems of this type, it is desirable for the control of the brake system to take into account the shift in load from one axle to another which occurs during braking so that the efficiency of the braking operation can be improved. Various solutions to this problem are known according to the state of the art. For example, U.S. Pat. No. 4,714,299 describes an electronic braking force control system, in which the weight of the vehicle is calculated from the braking pressures and the deceleration, and a new brake pressure distribution is then determined from the vehicle weight. To determine the brake pressure distribution, therefore, it is necessary to establish a connection between the brake pressure, the deceleration, and the corrected brake pressure. This requires a great deal of computing work, and a great deal of time is required for the system to produce its full effect. Because the axle load is determined only in a time-consuming, indirect manner, the extent to which the dynamic shift in the axle load can be taken into account during the braking process is far from complete.

SUMMARY OF THE INVENTION

It is the task of the invention to provide measures by means of which the static and dynamic shifts in axle load can be taken into account in the control of the brake system, particularly closed-loop control, even in cases where control is being exerted on the brakes of one or more axles on which the axle load or loads are not being detected directly.

This is achieved by measuring the static load at a first axle, the static load being the load which is present in the absence of a driver's input (braking). The dynamic load at that axle is also measured, the dynamic load being the load which is present in the presence of a driver's input. At least one operating variable for the brakes at a second axle (e.g. pressure) is adjusted as a function of static and dynamic loads at the first axle.

The invention improves the control of a brake system, particularly closed-loop control, by taking into account the dynamic shift of the axle load.

It is a particular advantage that it is sufficient for the axle load to be detected at only one point on the vehicle. Thus the optimum braking force with respect to the use of frictional adherence and vehicle mass can be applied for the entire vehicle by means of a simple, low-cost axle load detection system.

It is especially advantageous that frictional adherence is exploited equally at both the front axle and at the rear axle(s) during the braking process.

Another advantage is that, for the axle on which the axle load is detected directly, a reducing factor for the control of the brake pressure is determined directly from the measured axle load value, whereas, for an axle on which the load is not detected directly, a reducing factor is arrived at indirectly by taking into account the direction in which the dynamic load displacement occurs.

DESCRIPTION OF THE PREFERRED EMBODIMENTS

Figure 1:
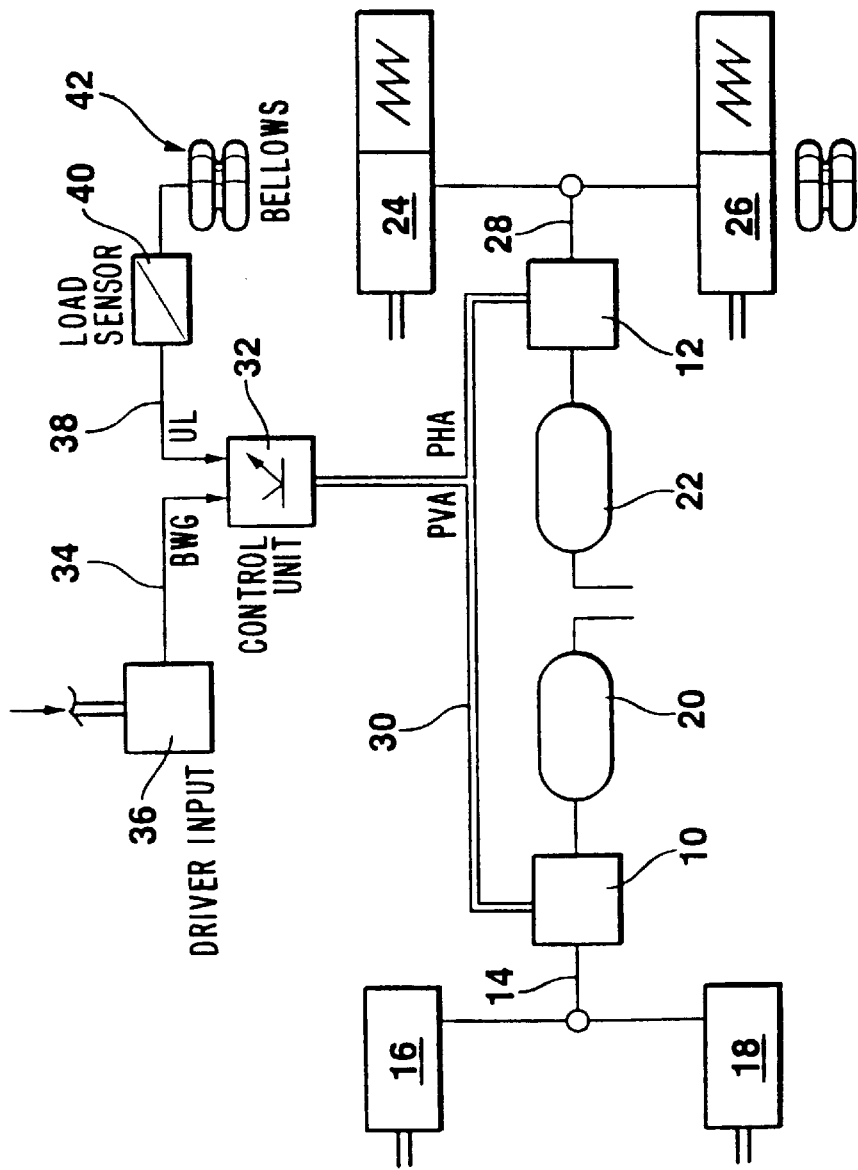
FIG. 1 is a diagram of a closed-loop electronically controlled brake system of a vehicle.

The brake system of a vehicle shown by way of example in FIG. 1 has at least two pressure control modules 10, 12, which adjust the brake pressure on at least two axles of the vehicle. Let us say that pressure control module 10 is assigned to the front axle of the vehicle. By way of line 14, it controls the brake pressure in brake cylinders 16, 18 for the wheels of this axle. In a manner known in itself, the pressure control module takes the energy required for braking from a reservoir 20 and controls the pressure in the brake cylinders. In a corresponding manner, pressure control module 12 with its reservoir 22 is assigned to the rear axle of the vehicle. It controls the pressure in brake cylinders 24, 26 of the wheels of the rear axle by way of system of lines 28. Pressure control modules 10, 12 are connected by way of a communications system 30, e.g., CAN (computer area network), to an electronic control unit 32, so that information and data can be exchanged. A signal from a brake value sensor 36, which can be actuated by the driver, is sent to control unit 32 over a line 34. In addition, a line 38 from a sensor 40 for detecting the load on an axle is also connected to control unit 32; in a preferred exemplary embodiment, this sensor is a pressure sensor, assigned to the rear axle, and is used to measure the pressure in pneumatic spring bellows 42 on the rear axle.

In the brake system illustrated in FIG. 1, the driver provides the input value for braking by actuating brake value sensor 36, which responds either to the force exerted on it or to the distance by which it is moved. The sensor 36 sends a signal corresponding to its actuation to electronic control unit 32. In addition, the load state on at least one axle of the vehicle is detected by load sensor 40. Control unit 32 establishes a relationship between the actuation signal and the load signal in accordance with a predefined formula, and the desired pressure values PVA, PHA to be reached in the various cases are transmitted via communications system 30 to pressure control modules 10, 12 assigned to the axles. The control modules 10, 12 detect the pressure in the brake cylinders and regulate the pressure so that it matches the desired values PVA, PHA.

The procedure according to the invention described below is used in an advantageous manner in systems in which the application stroke of the brakes is brought about by pneumatic, hydraulic, and/or electrical means and also in brake systems which, in addition to the basic brake circuit, also include an emergency brake circuit controlled by different means. In addition, not only the brake pressure in the brake cylinders but also the braking force, the deceleration of the vehicle, the braking moment, etc., can also be adjusted under a system of overlying control circuits. In addition to the brake system described, the vehicle can also be provided with a brake antilock system and additional sensors, such as sensors for detecting the brake temperature, the amount of brake wear, and the coupling force. These measurement values can then be used to help determine the brake pressure distribution. In addition, not only vehicles with pneumatic suspensions but also those with leaf-spring suspensions can be provided with an axle load measurement system.

Figure 2A:
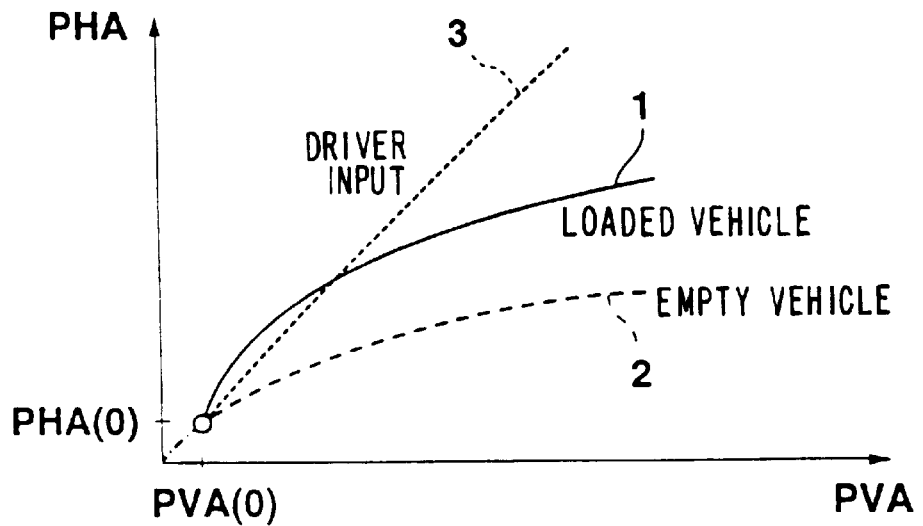
FIG. 2A is a plot showing the basic relationships for the brake pressure distribution between a front axle and a rear axle.

When a vehicle is braked, weight is shifted from the rear axle to the front axle. The extent of this effect depends on the mass of the vehicle, on its deceleration, and on the ratio between the height of the center of gravity and the wheel base. According to the EU Guideline 71/320/EU for brake systems, not only the braking force distribution over the axles of individual vehicles but also a certain total braking force at the wheels is prescribed for utility vehicles in order to maintain compatibility between vehicles which pull and those which are pulled. In many cases, therefore, it is necessary for the braking force to be adjusted at both axles as a function of load. In accordance with a preferred exemplary embodiment of the invention, under consideration of the cited guideline, the braking pressures are distributed over the vehicle axles for both a loaded and an unloaded vehicle as shown in FIG. 2a, which shows the example of a vehicle with a front axle and at least one rear axle. Dotted curve 3 shows the input value for the braking force given by the driver; solid curve 1 shows the braking pressure distribution for a fully loaded vehicle; and dashed curve 2 shows the braking pressure distribution for an empty vehicle. PVA and PHA indicate the pressure at the front and rear axles, respectively. As soon as the pressure arrived at in the brake cylinders shows a braking action at the wheel brakes (see PVA(0) and PHA(0)), the pressure increase at the front and rear axles starts to deviate from the input value (curve 3), independently of the (static and the dynamic) axle load. The curves shown have proven to be suitable in an exemplary embodiment. In other exemplary embodiments, curves with a different appearance may prove more effective. The expert will be able to define which curves are suitable.

Figure 2B:
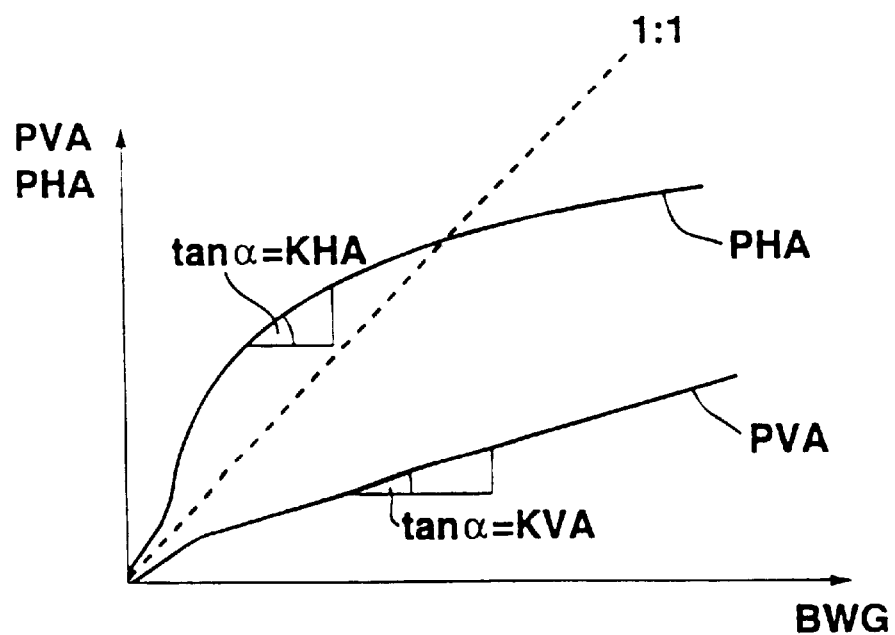
FIG. 2b is a plot showing the front and rear brake pressures as a function of an actuating signal BWG.

The same applies to the dependence, shown in FIG. 2b, of the front and rear axle braking pressures on actuation signal BWG. The input BWG from the brake value sensor 36 can correspond not only to the illustrated braking pressure value but also to a braking force or a deceleration value. While pressure is the operating variable for pneumatic or hydraulic brakes, an electrical signal would be the operating variable for electric brakes, which have a motor at each wheel to control the braking force. Force may be calculated from the operating variable and the wheel speed. For a certain load, the expert can allow the braking pressure at an axle to follow any desired type of curve (e.g., proportional, progressive, or degressive). The only important point in this regard is that the correct relationship always be maintained between this axle and the other axle or axles. The slope of the curve in question corresponds to a reducing factor K. This reducing factor is the factor by which the pressure value output at the pressure control module assigned to the axle in question deviates from the 1:1 correlation. (shown in broken line). These reducing factors are load-dependent in correspondence with the desired, predefined braking pressure distribution.

The brake system can be controlled in a load-dependent manner by a program running on the microcomputer or microcomputers of the electronic control unit. One way in which this can be done is illustrated on the basis of the flow chart in FIG. 3.

Figure 3:
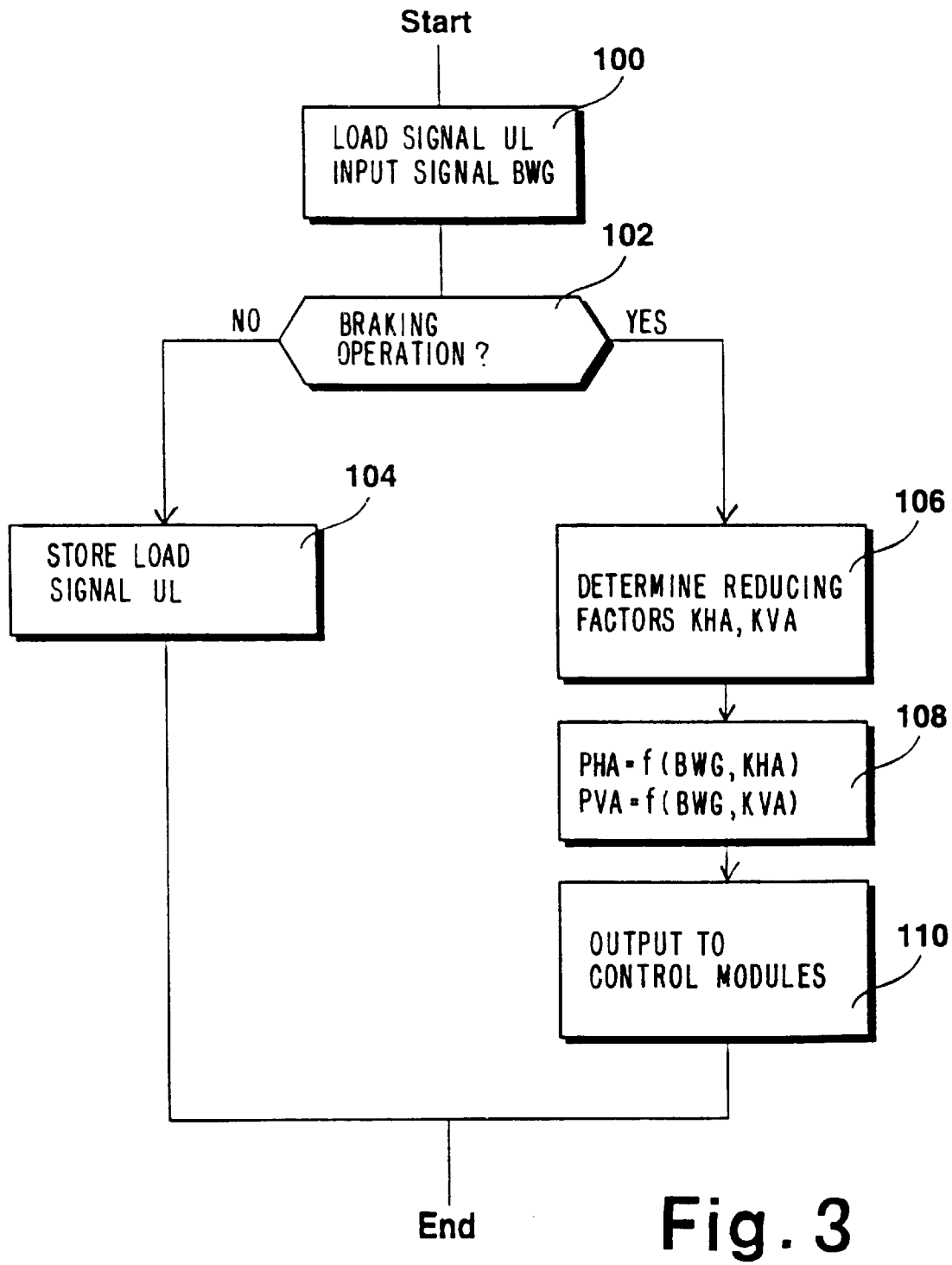
FIG. 3 is a flow chart, which illustrates how the change in axle load is taken into consideration as the brake system is being controlled.

The section of the program illustrated in FIG. 3 begins to run at predefined times, typically at time intervals of 10 to 100 msec. As soon as it starts, the current load signal UL and the input signal BWG of the brake value sensor are entered in a first step 100. In the following query step 102, the program determines whether a braking operation is in progress. An effective way of doing this is by means of the input signal BWG. That is, it can be assumed that this signal will exceed a predefined threshold value whenever the driver actuates the brake pedal. The program will therefore be able to recognize in step 102 when the vehicle is being braked. If the vehicle is not being braked, the current load signal value is stored as a static load signal value $UL_{stat}$ in step 104. Because this value is stored until a braking process begins, the stored load signal value represents during the braking process the static load prevailing immediately prior to the initiation of the braking. After the load signal value has been stored, this section of the program ends and is ready to run again when needed.

If the program determines in step 102 that a braking process is in progress, then the reducing factors KHA and KVA for the rear and front axles are calculated in step 106. Concrete procedures for determining the reducing factors are illustrated in FIGS. 4–7. In the following step 108, the pressure values PHA and PVA to be arrived at on the rear and front axles are calculated at least as a function of the input value BWG and the reducing factors KHA and KVA, respectively, on the basis of the predefined curves. In step 110, these pressure values are sent to the braking pressure control modules, which then adjust the braking pressure. This section of the program is thus over and is ready to run again when needed.

Figure 4:
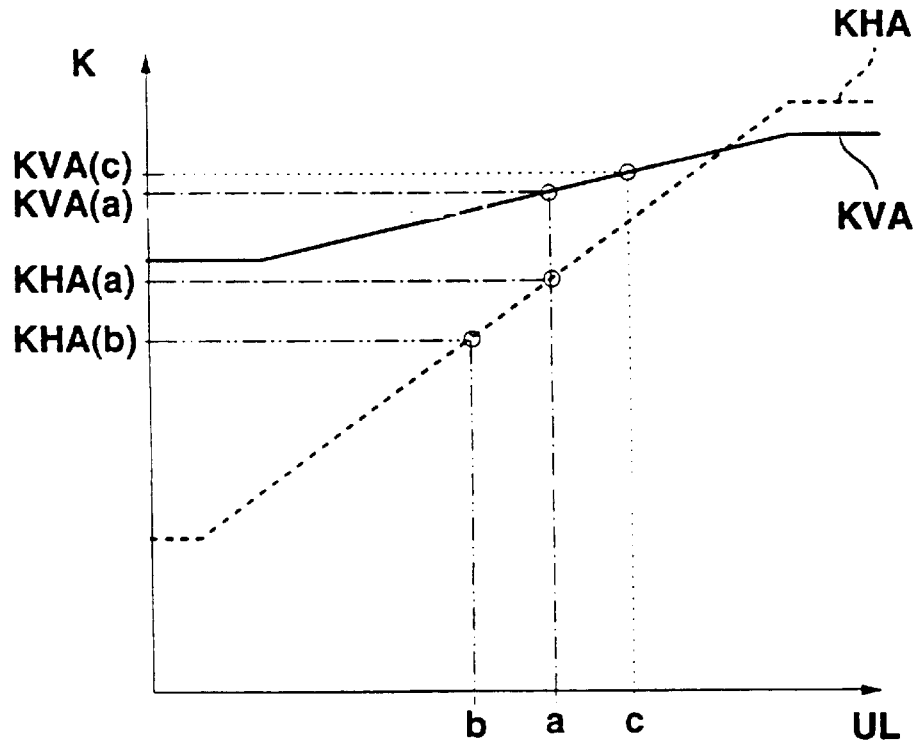
FIGS. 4 and 6 are plots showing pressure reducing factors as a function of axle load.
Figure 6:
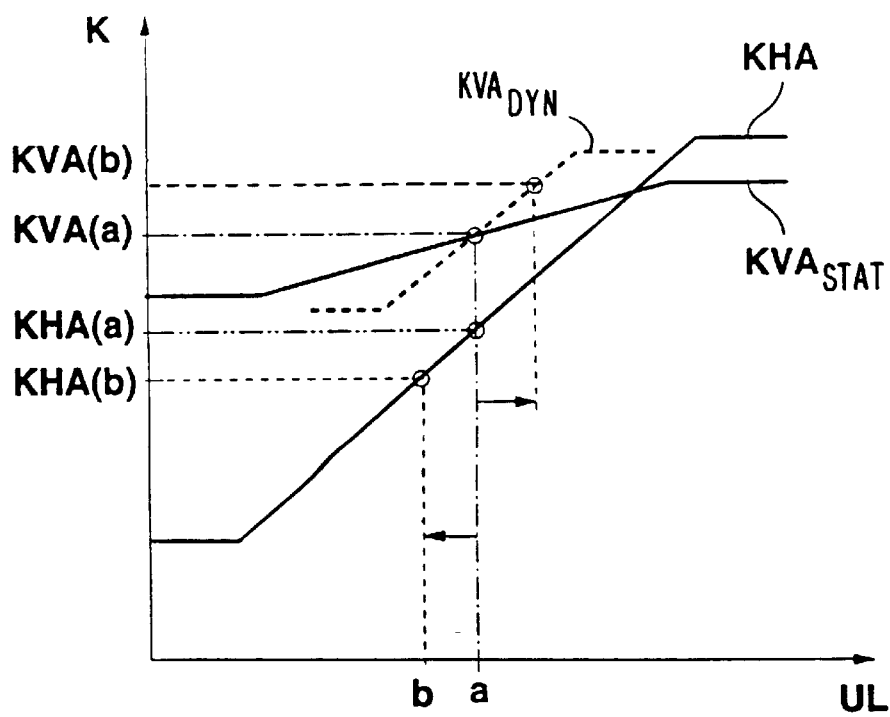
Figure 5:
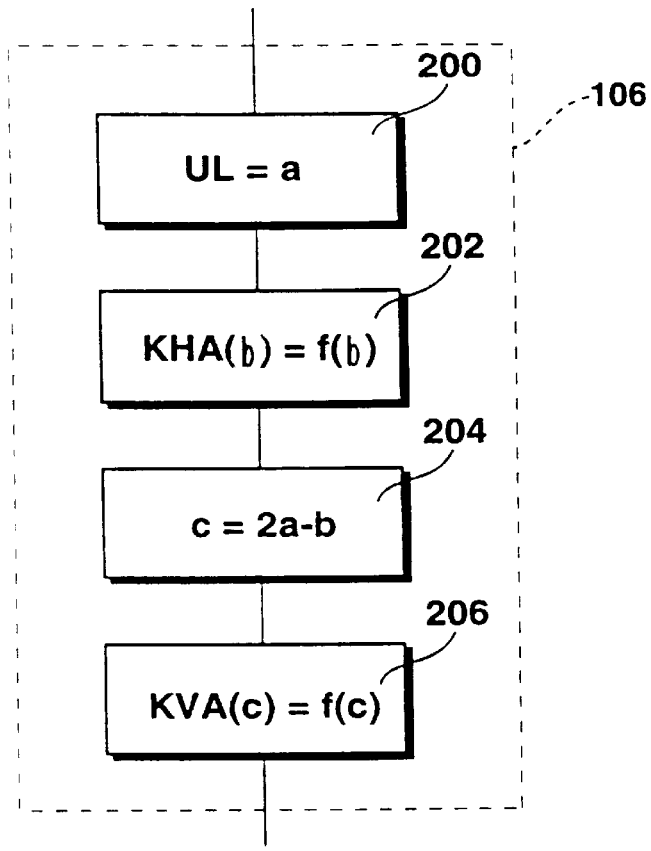
FIGS. 5 and 7 are flow charts, illustrating the procedures for calculating the reducing factors for the braking pressures.
Figure 7:
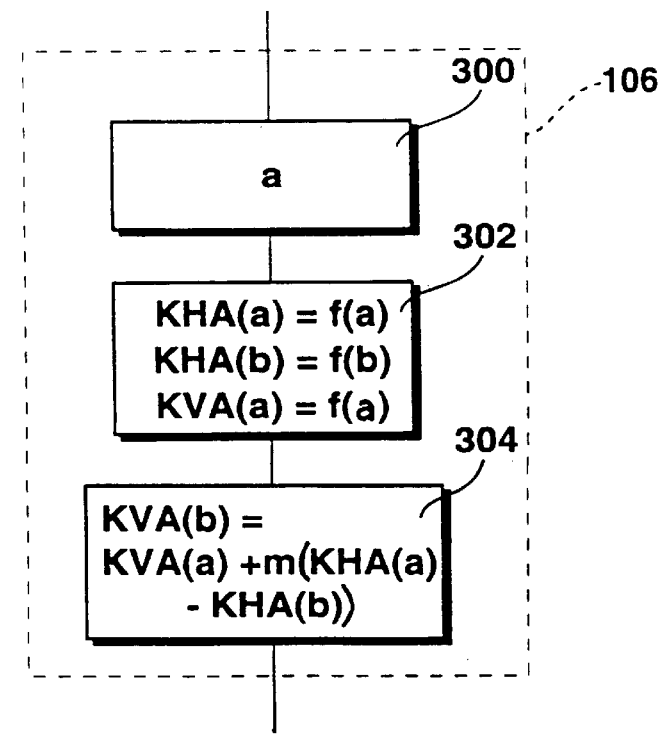

The method used to determine the reducing factors for the front and rear axles is explained on the basis of the exemplary embodiments illustrated in FIGS. 4 and 5 and in FIGS. 6 and 7.

In the example according to FIG. 4, a curve of the reducing factor K versus the axle load or the corresponding measurement value UL is prescribed for the front axle (KVA) and the rear axle (KHA). This curve will be derived from the desired, axle load-dependent braking pressure distribution curve, which has been defined by the expert with the goal of optimizing the braking behavior. In this case, the axle load on at least one axle is not determined directly. In the preferred exemplary embodiment, only one measuring sensor is provided for the axle load, and it is installed on the rear axle.

In the unbraked state, let us say that the axle load UL has a value a. Let this value be stored as the static load $UL_{stat}$. The static load of the front axle is determined from this measurement value on the basis of stored data for extreme operational states, i.e. the fully loaded and unloaded state for the front and rear axles (bracket data). For a load a, the brake pressure would be controlled in accordance with reducing factors KHA(a) and KVA(a). During the braking process, however, the load on the rear axle decreases as a result of the shift of weight. Let the axle load measured during the braking process be the measurement value b. The pressure on the rear axle is therefore reduced during this braking process by the reducing factor KHA(b), because the reducing factor is lowered. A corresponding reduction in the brake pressure at the front axle by KVA(b) would mean a mistake in the consideration of the load shift, because the load on the front axle is increased during the braking process. For the front axle, the correct load is determined indirectly. The load on the front axle during the braking process is calculated from the static load value a and the decrease a−b in the load on the rear axle. Thus a value c is obtained as the sum of the static value a and the load decrease a−b at the rear axle during the braking process. The load value c is assigned to the reducing factor for the front axle KVA(c). The braking pressure at the front axle is reduced to a lesser extent than it would have been in the presence of load a alone.

This determination of the reducing factors carried out in step 106 is illustrated on the basis of the flow chart in FIG. 5. According to the chart, the program accepts the stored measured axle load value $UL_{stat}=a$ in the unbraked state in the first step 200. In the following step 202, the reducing factor KHA(b) of the rear axle is determined on the basis of the actual axle load b (see step 100) from the curve according to FIG. 4. Thereupon, in step 204, load c of the front axle is calculated from the stored static load a and the dynamic load b of the rear axle. In step 206, the reducing factor KVA(c) for the front axle is determined on the basis of this load c. The reducing factors determined in this way are used to control the braking pressure.

The required reducing factor for the axle on which the axle load is measured directly is therefore determined directly from the axle load. The pressure for the other axle is adjusted indirectly under consideration of the direction in which the dynamic load shift is occurring.

A second exemplary embodiment is shown in FIGS. 6 and 7. Here, too, it is assumed that a vehicle is present in which a relationship, as shown in FIG. 6, has been defined between the axle load signal UL and the reducing factors KHA and KVA. If, to keep costs down, a load sensor is installed only on the rear axle, the load on the other axle is estimated as described above from this measurement value. When a vehicle is being braked to slow it down as it is traveling forward, the axle load shifts from the rear axle to the front axle. If this change in the axle load during braking is to be used to help adjust the pressure at the front and rear axles, then it is necessary to take into account the dynamic axle load during the braking process.

During the braking process, the dynamic axle loads and the reducing factors are determined from the actual and the static axle load values. During a braking process, for example, the axle load b is measured at the rear axle. For the rear axle, the reducing factor KHA(b) is then determined directly on the basis of the curve. Because the decrease in load at the rear axle corresponds to the increase in load at the front axle, the reducing factor KVA(b) for the front axle is determined according to the invention by means of the equation:

$$KVA(b)=KVA(a)+M\times(KHA(a)-KHA(b)).$$

The dynamic change in the reducing factor at the front axle is proportional to the negative change in the reducing factor at the rear axle. The proportionality factor M comprises, for example, the ratio of the shift in braking action from front to rear. As a result of this measure, frictional adherence is taken advantage of equally at both the front and rear axles.

As illustrated by the dashed line in FIG. 6, the dynamic reducing factor KVA proceeds along a curve different from that of the static change. It is advantageous here for the dynamic change of the reducing factor to be limited to certain ranges of values (see horizontal boundaries of the straight dashed line). The system switches from the static reducing factor to the dynamic reducing factor for the front axle as soon as braking begins (see FIG. 3).

This procedure is illustrated on the basis of the flow chart of FIG. 7. According to the chart, the program accepts the stored axle load value $UL_{stat}=a$ in the first step 300; and in the following step 302, the reducing factors are determined for the static case (KHA(a)) and KVA(a)), and the reducing factor of the rear axle is calculated for the dynamic case KHA(b) in accordance with the curve according to FIG. 6 and the actual load value b (see step 100 in FIG. 3). Then, in step 304, the dynamic reducing factor for the front axle KVA(b) is calculated on the basis of the equation given above. The program now continues with the next section according to FIG. 3.

The procedure according to the invention has been described above on the basis of a vehicle with axle load sensing on a rear axle. When the axle load sensor is installed on the front axle, the braking pressure is controlled as a function of the axle load in a corresponding manner but with the opposite sign. In a vehicle with more than two axles, it is possible to provide axle load sensors on several axles. The procedure according to the invention can also be applied advantageously in cases where at least one axle is not provided with any means of direct axle load measurement.

In a vehicle of this type, reducing factors are provided for each axle in that the measurements of the load made on one axle during the braking process are used to determine the reducing factors for the other axles by means of the procedure according to the invention. If the vehicle has, for example, two rear axles and one front axle, and if the axle load sensor is installed on a rear axle, then, in the simplest case, the value of the sensed axle is assumed as the reducing factor for the other rear axle, whereas the value for the front axle is calculated as described above. In the case of two front axles, the factor calculated for one axle is again used in the simplest case for the braking control of the second axle. Of course, the reducing factor for the second axle can also be slightly modified in a specific case.

The procedure according to the invention can also be applied advantageously when the vehicle is traveling backwards, but the signs are reversed.

In an especially advantageous exemplary embodiment, the reducing factors KHA(a) and KVA(a) of the rear and front axles, respectively, calculated from the static load measurement values, rather than the static load measurement values themselves, are stored during unbraked travel. During the braking process, these value are then available as static reducing factors.

What is claimed is:

1. Process for controlling the brake system of a vehicle having at least a first axle and a second axle, a load on each axle, brakes at each axle, which brakes are influenced by at least one operating variable, means for providing a driver's input to brakes at each axle, and means for adjusting said at least one operating variable as a function of the driver's input, said process comprising determining whether any driver's input to the brake is present, measuring the static load at said first axle, said static load being the load which is present in the absence of a driver's input, measuring the dynamic load at said first axle, said dynamic load being the load which is present in the presence of a driver's input, and adjusting said at least one operating variable for the brakes at said second axle as a function of the static load and the dynamic load at the first axle, providing a static reducing factor and a dynamic reducing factor for each axle which are dependent on the measured static and dynamic loads at said first axle, said at least one operating variable at each axle being adjusted as a function of the respective reducing factors and the driver's input, wherein the static and dynamic reducing factors for the first axle and the static reducing factor for the second axle are determined as a function of the measured axle loads, and wherein a difference between the static and dynamic loads of the first axle is calculated, and the dynamic reducing factor of the second axle is determined from a predetermined curve based on said difference.

2. Process for controlling the brake system of a vehicle having at least a first axle and a second axle, a load on each axle, brakes at each axle, which brakes are influenced by at least one operating variable, means for providing a driver's input to brakes at each axle, and means for adjusting said at least one operating variable as a function of the driver's input said process comprising determining whether any driver's input to the brake is present, measuring the static load at said first axle, said static load being the load which is present in the absence of a driver's input, measuring the dynamic load at said first axle, said dynamic load being the load which is present in the presence of a driver's input, and adjusting said at least one operating variable for the brakes at said second axle as a function of the static load and the dynamic load at the first axle, providing at least one of a first reducing factor (KHA) and a second reducing factor (KVA) for each axle which are each dependent on the measured static and dynamic loads at said first axle, said at least one operating variable at each axle being adjusted as a function of the respective first and second reducing factors and the driver's input, wherein said first and second reducing factors for the first axle and said first and second reducing factors for the second axle are determined as a function of the measured axle loads, and wherein the at least one of said first and second reducing factors for the second axle is determined from a predetermined curve based on the difference between the static and the dynamic loads of the first axle.

3. Process according to claim 2, wherein the values are determined on the basis of a first correction factor (KHA) for said first axle, said first correction factor being determined depending on the measured load and a second correction factor (KVA) for the said second axle, at which the load of the vehicle is not measured, said second correction factor being determined on the basis of the load measured at the first axle so that a change in the load leads to a change in the second correction factor in an opposite direction.

4. The process of claim 2, further comprising storing said load values, wherein at least one of said first and second factors is a static factor, and determining said static factor from said stored factor.

5. An apparatus for controlling the brake system of a vehicle having at least a first axle and a second axle, a load on each axle, brakes at each axle, which brakes are influenced by at least one operating variable, means for providing a driver's input to brakes at each axle, and means for adjusting said at least one operating variable as a function of the driver's input, said process comprising means for determining whether any driver's input to the brake is present, means for measuring the static load at said first axle, said static load being the load which is present in the absence of a driver's input, means for measuring the dynamic load at said first axle, said dynamic load being the load which is present in the presence of a driver's input, and means for adjusting said at least one operating variable for the brakes at said second axle as a function of the static load and the dynamic load at the first axle, means for providing a static reducing factor and a dynamic reducing factor for each axle which are dependent on the measured static and dynamic loads at said first axle, said at least one operating variable at each axle being adjusted as a function of the respective reducing factors and the driver's input, wherein the static and dynamic reducing factors for the first axle and the static reducing factor for the second axle are determined as a function of the measured axle loads, and wherein a difference between the static and dynamic loads of the first axle is calculated, and the dynamic reducing factor and the second axle is determined from a predetermined curve based on said difference.

6. An apparatus for controlling the brake system of a vehicle having at least a first axle and a second axle, a load on each axle, brakes at each axle, which brakes are influenced by at least one operating variable, means for providing a driver's input to brakes at each axle, and means for adjusting said at least one operating variable as a function of the driver's input said process comprising means for determining whether any driver's input to the brake is present, means for measuring the static load at said first axle, said static load being the load which is present in the absence of a driver's input, means for measuring the dynamic load at said first axle, said dynamic load being the load which is present in the presence of a driver's input, and means for adjusting said at least one operating variable for the brakes at said second axle as a function of the static load and the dynamic load at the first axle, means for providing at least one of a first reducing factor (KHA) and a second reducing factor (KVA) for each axle which are each dependent on the measured static and dynamic loads at said first axle, said at least one operating variable at each axle is capable of being adjusted as a function of the respective first and second reducing factors and the driver's input, wherein said first and second reducing factors for the first axle and said first and second reducing factors for the second axle are determined as a function of the measured axle loads, and wherein at least one of said first and second reducing factors for the second axle is determined from a predetermined curve based on the difference between the static and the dynamic loads of the first axle.

* * * * *